(12) United States Patent
Korn et al.

(10) Patent No.: US 8,103,480 B2
(45) Date of Patent: Jan. 24, 2012

(54) EVALUATING SERVICE LEVEL AGREEMENT VIOLATIONS

(75) Inventors: Amitay Korn, Kfar Vradim (IL);
Subramoniam N. Iyer, Newark, CA (US); Lars Rossen, Palo Alto, CA (US); Dennis Clemmer, Chagrin Falls, OH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 582 days.

(21) Appl. No.: 12/262,632

(22) Filed: Oct. 31, 2008

(65) Prior Publication Data
US 2010/0114531 A1    May 6, 2010

(51) Int. Cl.
*G06F 1/03* (2006.01)
*G06F 1/14* (2006.01)
*G06F 1/02* (2006.01)
*G06F 3/03* (2006.01)

(52) U.S. Cl. ......... 702/186; 702/182; 702/185; 702/188
(58) Field of Classification Search ............... 702/179, 702/181, 182, 186, 187, 188, 189; 705/10; 709/226, 232
See application file for complete search history.

(56) References Cited

U.S. PATENT DOCUMENTS

| 7,401,040 B2 * | 7/2008 | Sloan et al. ................ 705/36 R |
| 7,519,725 B2 * | 4/2009 | Alvarez et al. ................ 709/232 |
| 2006/0265272 A1 * | 11/2006 | Bosa et al. ..................... 705/10 |

* cited by examiner

*Primary Examiner* — Michael Nghiem
*Assistant Examiner* — Felix Suarez

(57) ABSTRACT

A technique for evaluating service level agreement (SLA) violations occurring in a computing system with agreed-upon model for exemptions is provided. The technique includes storing in a memory a model of the SLA and identifying occurrence of an SLA violation in a computing system that is providing services under the SLA. Based on the stored model, the technique further determines if the SLA violation is exempted from a penalty.

16 Claims, 3 Drawing Sheets

EVALUATING SERVICE LEVEL AGREEMENT VIOLATIONS

BACKGROUND

Many businesses outsource portions of their information technology (IT) needs to IT outsourcing providers. These providers usually make their business more efficient by constructing large data centers. The data centers offer a variety of different computing resources and services to multiple customers, each of whom may have different IT requirements. The relationship between the providers and their customers is typically governed by a Service Level Agreement (SLA) that sets forth the provider's various objectives regarding the level of service that will be available to a particular customer and the penalties that will be incurred if the service level objectives are not met. For instance, depending on a level of service selected by a customer, the SLA may specify time windows (i.e., the days of the week and hours) of availability and certain performance metrics or quality of service (QoS) guarantees, such as the percentage availability of the services during the time windows, average response time of the service, etc. The terms of SLAs also typically include limitations that may exempt the service provider from meeting its objectives, such as brown-out conditions, force majeure events, etc.

However, in many instances, the service provider and the service recipient have not formally or completely defined the underlying details of the limitations and exemptions in the SLA. Thus, when an SLA violation has occurred, the parties often are faced with resolving the issue through an arbitration process in which the parties deliberate whether or not a specific failure to meet an objective is the fault of the service provider and whether or not a penalty should be assessed as a result of the violation. This process is time-consuming and costly and potentially results in friction between the service provider and customer.

BRIEF DESCRIPTION OF THE DRAWINGS

Some embodiments of the invention are described with respect to the following figures.

DETAILED DESCRIPTION

Figure 1:
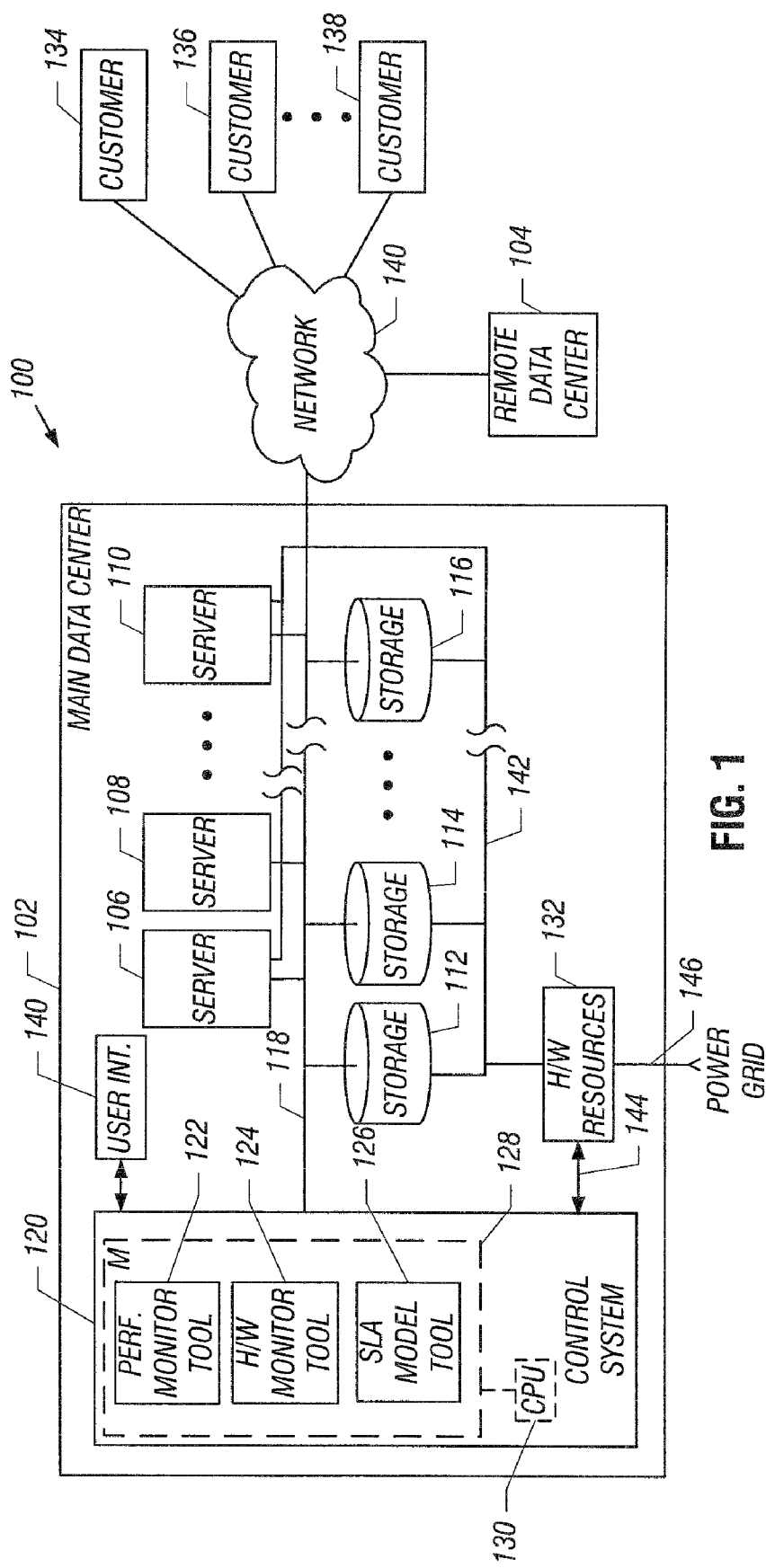
FIG. 1 is a block diagram of an exemplary computing system that provides information technology services to customers in accordance with an embodiment of the invention.

FIG. 1 illustrates an exemplary arrangement of a computing system 100, such as a complex IT system or shared hosting environment, in which the control techniques and systems of the present invention may be implemented. In this example, computing system 100 includes multiple data centers 102, 104 to provide a shared hosting platform. In the embodiment shown, the data center 102 includes a plurality of servers 106, 108, 110 and storage devices 112, 114, 116 that are configured to store data associated with the servers 106-110. The servers 106-110 and storage devices 112-116 are interconnected by an interconnect 118, that may include, for instance, system buses, fast interconnects, a local area network, a wide area network, a storage area network, or any other type of communication link. Although three servers 106-110 and three storage devices 112-116 are depicted in FIG. 1, it is understood that the data center 102 may include more than three servers and three storage devices, depending on the particular application in which the data center 102 is employed. The servers may be, for example, application servers, storage servers, web servers, etc. Further, although each of the servers is depicted in FIG. 1 as being contained within a box, a particular server may be a distributed machine, which has multiple nodes that provide a distributed and parallel computing system. Moreover, each box is not necessarily representative of a physical machine but may, in fact, represent a virtual instance of a server.

The storage devices 112-116 are adapted to store data associated with the servers 106-110. Each of the servers 106-110 could be coupled to one or more of the storage devices 112-116, and each of the servers 106-110 could access the storage devices 112-116 for storing and/or retrieving data from those devices. Each of the storage devices 112-116 could be an independent memory bank. Alternatively, the devices 112-116 could be interconnected, thus forming a large memory bank or a subcomplex of a large memory bank. The devices 112-116 may be, for example, magnetic memory devices, optical memory devices, flash memory devices, etc., depending on the particular implementation of system 100 in which the devices are deployed.

The data center 102 also includes a control system 120 for controlling various aspects of the data center 102. For instance, the control system 120 may include a user interface 140 for relaying information regarding the performance of the system to the system operator and/or for inputting various parameters for controlling the data system 102. The control system 120 also may include various software tools, such as a performance monitoring tool 122, a hardware or operations monitoring tool 124, an SLA modeling tool 126, and other tools (e.g., a failure analysis tool) to facilitate the control and monitoring of the data center 102, as will be explained in further detail below. To implement these various features, the control system 120 includes a memory 128 for storing the software tools and other applications and instructions of software that are executed by a processor 130.

Although the tools 122, 124 and 126 are shown as separate modules in FIG. 1, it should be understood that the tools 122-126 may be part of an integrated management application that is implemented by the control system 120. Such a management application may include additional or different tools and features than those illustrated in FIG. 1. Also, although control system 120 is illustrated as located at the data center 102, the control system 120 may be located at another data center, distributed across multiple data centers, or may be located at a standalone location remote from any data center. Yet further, each data center may include its own control system 120 that cooperates with other control systems 120 as may be appropriate to accomplish various tasks, such as the tasks described herein.

The data center 102 further includes various hardware resources 132 used for the operation of the data center 102. These hardware resources 132 may include, for example, power supplies, air conditioning systems, network routers, etc., and may be coupled to the servers 106-110 and storage devices 112-116 via an appropriate interconnect 142. The hardware resources 132 also may be coupled to the control system 120 via an interconnect 144 that is configured to conduct various signals, such as electrical power and control and monitoring signals. In some embodiments, the hardware resources may be configured in a redundant manner, such that certain of the resources are available for use as backup resources. As shown in FIG. 1, the hardware resources 132 may receive electrical power from a power grid (e.g. a public power utility) through one or more power connections 146.

The data center 104 may include similar features, but is located remote from the data center 102. To provide for redundancy measures, the data center 104 also may be independent of the data center 102. The data centers 102 and 104 are connected to each other and to a plurality of customers 134, 136, 138 through a network 140. The network 140 may include, for instance, the Internet, a proprietary wide area network, a storage area network, or any other type of appropriate communication link. Further the network 140 may include a plurality of communication links that are arranged in a redundant manner.

When customers outsource their IT services to a service provider, the terms of the parties' relationship typically are set forth in a service level agreement (SLA). Generally, the SLA includes, among other terms, agreed-upon Service Level Objectives (SLOs), limitations on those objectives, and penalties that may be assessed on the service provider for failure to meet some of the objectives or a weighted rank for the whole SLA. In a general sense, the SLOs represent the level of service contracted for by the customer and may include, for instance, the percentage service availability during a specified time window (e.g., 99.95% availability from 8:00 a.m.-11:00 p.m. EST Monday-Friday), the maximum allowable response time for service requests during the time window (e.g., 3 seconds), etc. Other objectives may include average throughput, CPU cycles, etc. The SLA typically also sets forth a requirement to provide a periodic report that indicates whether the provider has met its SLOs and/or whether penalties for SLA violations have been assessed. To implement the reporting requirement, the data center 102 may include the performance monitoring tool 122 which is configured to observe performance parameters and assess whether the SLA objectives have been met during the reporting time period.

To determine whether the IT provider is meeting its agreed-upon objectives, performance metrics are monitored and collected on a periodic basis. Typically, the performance metrics are monitored using a monitoring tool that measures selected performance parameters, such as CPU usage, processing time, resource availability, network traffic, etc. The monitored parameters may then be used to adjust the performance of the system, such as by re-allocating shared resources, or to take other corrective action as may be needed (e.g., re-routing network traffic). When the performance parameters indicate that provided service is not in compliance with the objectives set forth in an SLA, then a violation has occurred and a penalty may be assessed. Penalties may be in the form of monetary payments, credits to the customer for the current or a future billing cycle, or any other agree-upon remuneration to compensate the customer for the failure to meet the SLOs.

Regardless of the form of the penalty, whether a penalty is imposed and the size of that penalty are dependent on the terms set forth in the SLA. Typically, penalties will be larger for customers that have contracted for a higher level of service. Generally, a higher level of service guarantees requires greater degrees of redundancy within the data center. If the customer is willing to invest in redundancy and, thus, the higher service level, more severe penalties are warranted if the service provider does not meet its objectives. If the customer is unwilling to invest in redundancy measures, then the risk increases that SLA objectives may not always be met.

The terms of each SLA will vary depending on the level of service desired by a customer. For instance, customers that desire a higher level of service may be willing to pay for more costly redundancy measures, as redundancy is the standard method to ensure continuous service levels, yet with an associated cost. In return for this investment by the customer, the service provider may agree to guarantee a higher percentage of availability and to expose itself to the assessment of higher penalties for SLA violations. Various redundancy measures may be offered by the service provider to the customer. As an example, different levels of redundancy measures may be implemented in the software resources, the database resources, and the hardware/operational resources. With respect to the software resources (e.g., application servers), the service provider may offer multiple options, including no redundancy, redundancy within a single data center only, or redundancy across multiple data centers. With respect to the database resources, the service provider again may offer multiple options, including no redundancy, periodic live backups of data, or cloning of one or more database servers at a remote independent data center. Likewise, multiple options may be offered with respect to the hardware/operational resources, such as redundant power supplies at one or more data centers, redundant network connections between the data centers and the customer, redundant air conditioning system at one or more data centers, redundant connections to a public electricity grid, cooling systems etc.

Depending on the redundancy measures selected by the customer, the parties may agree that certain terms may be included in the SLA that place conditions or limitations on the guaranteed level of service. For instance, if the customer opts for a level of service that does not provide for power supply redundancy, then the SLA may include an agreed-upon limitation that does not guarantee any service upon occurrence of a brown-out condition or a power outage caused by a force majeure event. Similarly, if the level of service does not include network redundancy, then the SLA may include an agreed-upon limitation that does not guarantee any level of service upon loss of connectivity due to a network provider outage. On the other hand, if the customer selects a higher level of service that does include some power supply redundancy and/or network, then the SLA may include an agreed-upon limitation, for instance, that the SLA objective will be met for a period of "x" hours after occurrence of a power outage event or that the percentage availability will be maintained for up to "y" network outages. The SLA may further provide that if a limitation on an SLO is triggered, then one or more related SLA violations are exempted from any penalty. Unfortunately, while the parties may well remember these agreed-upon performance limitations for some period of time after the SLA is negotiated, the passage of time generally ensures that the parties' intent with regard to the details of the limitations will be forgotten, especially when they are not defined and/or formalized in an understandable manner. As a result, disputes between the provider and its customers may arise regarding whether penalties should be assessed for certain SLA violations.

To help avoid this situation, the terms of an SLA may be modeled to formally define in a programmatically understandable manner when there is an agreed-upon reason to exempt SLA violations. By defining these "limitation rules", the SLA model allows an automatic association to be made between a service level violation and a possible exemption. If a violation can be associated with an exemption, then the violation may be automatically cleared as an exempted situation that has been pre-approved by both parties to the SLA. The provision of this automatic feature will reduce the need to manually evaluate SLA violations and determine whether exemptions apply.

Figure 2:
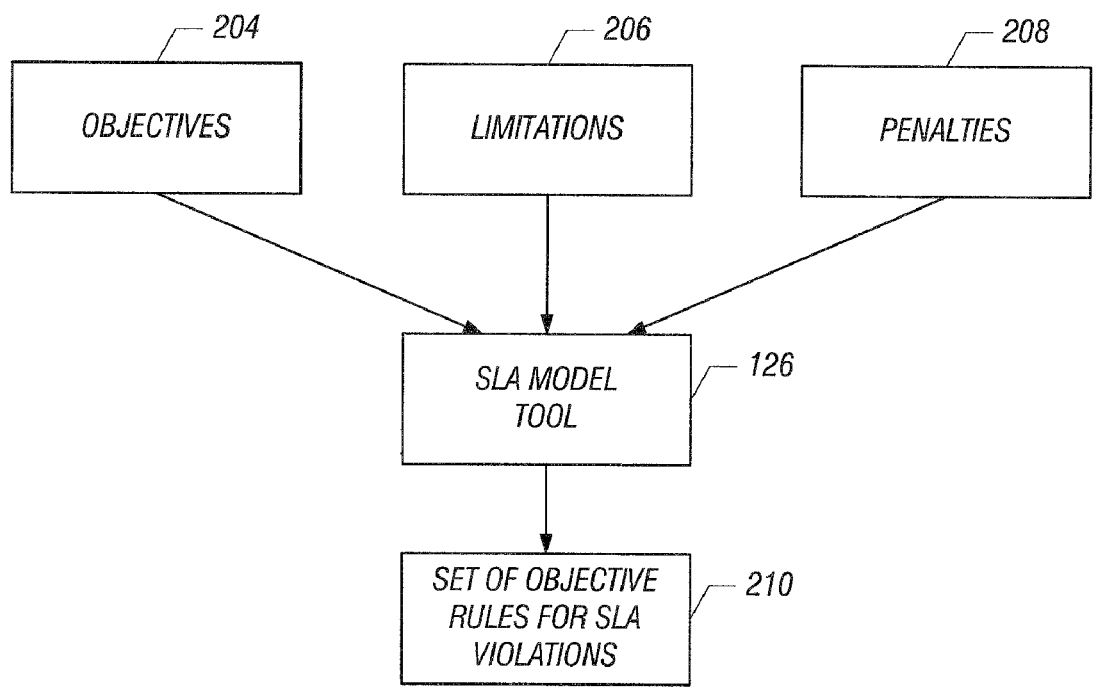
FIG. 2 is a block diagram illustrating exemplary inputs to and an output from an exemplary SLA modeling tool, in accordance with an embodiment of the invention.

To generate the set of rules, and as shown in FIG. 2, the terms of the SLA are input to the SLA modeling tool 126.

These terms includes SLA objectives 204, limitations 206, and penalties 208. Using these inputs, the SLA modeling tool 126 may generate a set of rules 210 that objectively defines exemptions of penalties if limitations on SLOs are triggered. These rules mark specific devices (Configuration Items) or 'connections' between these devices. Each marked entity, that has a service failure report against it for a certain period of time, will automatically exempt all business services covered by the relevant SLA that are topologically dependent on it.

Figure 3:
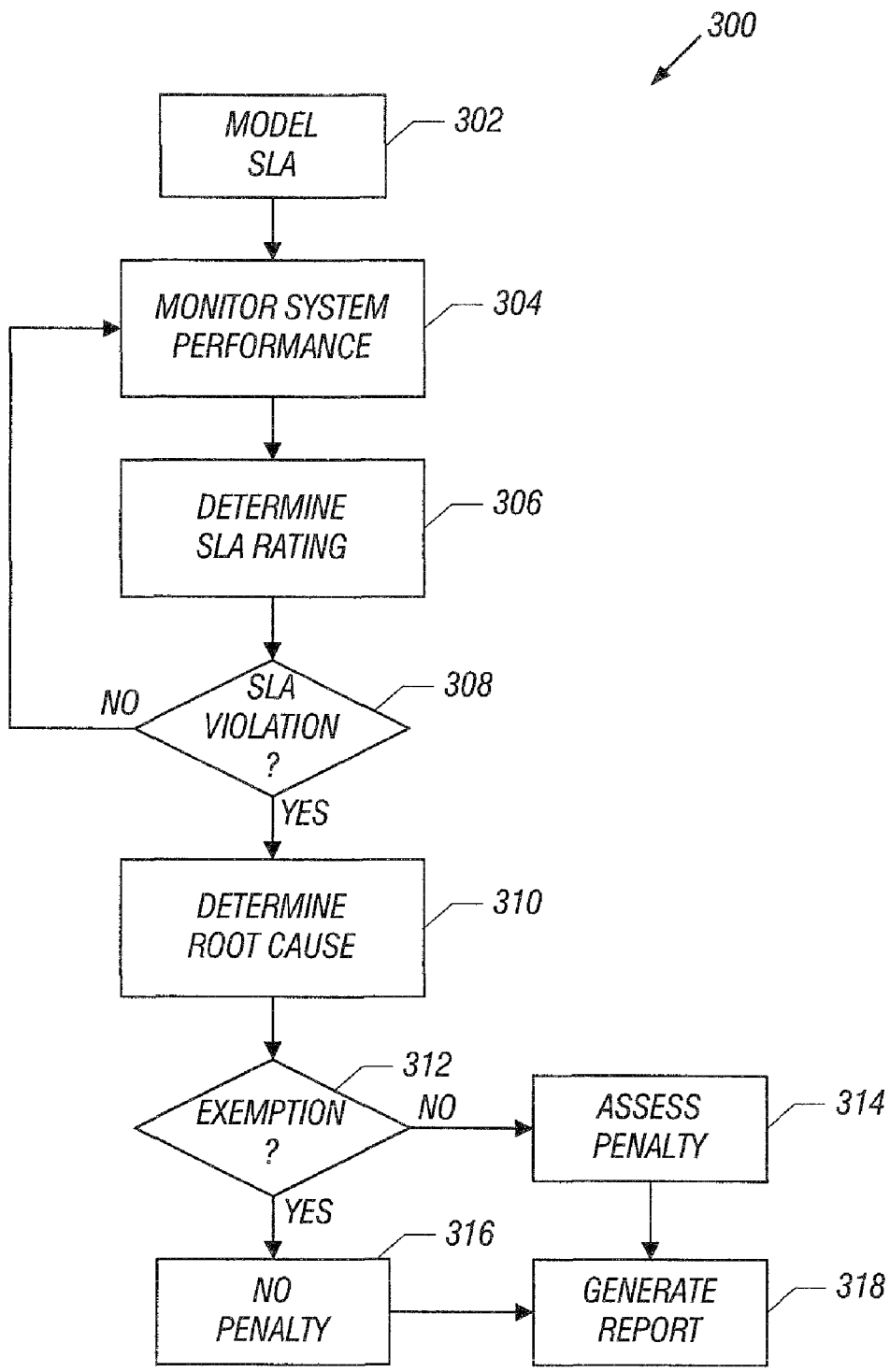
FIG. 3 is a flow diagram of an exemplary technique using the output of the SLA modeling tool to evaluating whether an SLA violation is exempt from a penalty assessment, in accordance with an embodiment of the invention.

With reference now to the technique 300 shown in the flow diagram of FIG. 3, once the set of objective rules 210 is defined by the SLA modeling tool 126 (block 302), monitoring and analysis of various performance parameters associated with the system 100 may be implemented to compute SLA ratings that may be compared to the agreed-upon objectives (blocks 304 and 306). Such monitoring and analysis of performance parameters may be performed using a variety of available performance monitoring tools 122, such as the HP Business Availability Center (BAC), available from Hewlett-Packard Co. The monitoring of the performance parameters and determination of SLA ratings typically is performed on a periodic basis, and is usually associated with billing periods. Determining SLA ratings frequently (e.g., daily) may help avoid the impositions of penalties since violations or potential violations may be detected and resources reallocated to bring the SLA ratings within the level of service set forth in the SLA.

An SLA violation may be detected by comparing the SLA ratings to the SLOs 204 that were input to the SLA modeling tool 126. If the comparison does not indicate the occurrence of an SLA violation (diamond 308), then the technique 300 continues to monitor system performance and determine SLA ratings. If an SLA violation is detected (diamond 308), the root cause for the violation may be identified (block 310). A root cause analysis may be performed in a variety of manners known in the industry, such as through use of an available failure analysis tool (e.g., HP Business Availability Center (BAC)—Problem Diagnostics Sub-system, available from Hewlett-Packard Co.), and generally entails associating an observed event (e.g., loss of power, loss of network connection, high demand for service, etc.), within its failure time-slice with the occurrence of the SLA violation. The set of rules 210 corresponding to the SLA model may then be used to determine whether or not the SLA violation is a pre-approved exemption for which a penalty will not be assessed (diamond 312, blocks 314, 316). A periodic report may be generated that indicates the result of the analysis (block 318).

The technique 300, or portions thereof, described with reference to FIG. 3 may be implemented as part of the performance monitoring tool 122, the hardware monitoring tool 124, the SLA modeling tool 126 and/or other tools or applications stored in the memory 128 of the control system 120. Although specific steps are shown in FIG. 3, it should be understood that the technique 300 could include fewer or additional steps than those illustrated.

Generation of a report that automatically identifies exemptions for SLA violations (block 318 in FIG. 3) eliminates the need for a time-consuming and potentially contentious arbitration process. In some embodiments of the invention, the report may also identify the particular clause in the SLA that contains the exemption so that the parties may more easily confirm that the report accurately reflects their prior agreement. The report also may be a useful tool for the customer to evaluate the desirability of investing in higher levels of service. For instance, the report may reveal that the customer's selection of a low level of service unavoidably results in many incidents in which the customer's desired service objectives are not achieved but which are exempted by the limitations set forth in the SLA. Thus, the results of the SLA model may be used as a tool that the parties can use to realistically evaluate investment decisions and to define and negotiate SLOs and exemptions.

The results of the SLA modeling technique described herein also may be used to highlight specific infrastructure areas that regularly cause objective service outages. The service provider can use the SLA model to improve the infrastructure and thus avoid SLA violations that do result in penalties.

The SLA modeling technique also may be extended for use in situations in which the customer agrees that the IT provider may provide multiple services that share the same resource. Such a situation may occur, for instance, where the customer consents to use of a single server to host multiple services. Here, if the server fails, multiple service failures will result, potentially creating the situation where the customer demands the assessment of separate penalties for each service outage. However, since the customer consented to the use of a shared resource, the SLA should include a limitation specifying that a single failure of the shared server will not result in multiple penalties. By modeling the parties' agreement using the SLA modeling technique described herein, the details of the multiple service outages may be readily captured. If the set of rules corresponding to the SLA reflects that only a single penalty will be imposed in this situation, then additional penalties will be considered exemptions that have been pre-approved by the customer.

Instructions of software described above (including the performance monitoring tool 122, hardware monitoring tool 124, SLA modeling tool 126, and technique 300) are loaded for execution on a processor (such as one or more CPUs 130 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more computer-readable or computer-usable storage media (such as a memory 128 shown in FIG. 1). The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The tasks of FIGS. 2 and 3 may be provided in the context of information technology (IT) services offered by one organization to another organization. For example, the infrastructure (such as the infrastructure shown in FIG. 1) may be owned by a first organization. The IT services may be offered as part of an IT services contract, for example.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A method executed by a computer for evaluating non-compliance of a computing system with a service level agreement (SLA) for computing services, comprising:
   storing in a memory a model of the service level agreement, the model to include an SLA objective and a limitation on the SLA objective;
   generating an exemption rule based on the SLA objective and on the limitation on the SLA objective, the exemption rule to be generated before the computing system is monitored for an indicator of noncompliance with the SLA objective;
   identifying an SLA violation in the computing system that occurs while providing computing services under the SLA; and
   automatically applying the exemption rule to determine whether the SLA violation corresponds with the limitation on the SLA objective such that the SLA violation is exempted from a penalty.

2. The method as recited in claim 1, further comprising generating a report including the result of applying the exemption rule, and if it is determined that the SLA violation corresponds with the limitation on the SLA objective, providing the portion of the SLA that contains the exemption for SLA violation in the report.

3. The method as recited in claim 1, further including identifying a root cause of the SLA violation.

4. The method as recited in claim 3, wherein generating an exemption rule further comprises generating a set of exemption rules, and wherein automatically applying the exemption rule comprises automatically applying the set of exemption rules to the identified root cause.

5. The method as recited in claim 1, wherein the SLA objective provides for the use of a shared resource, and applying the exemption rule includes determining whether the limitation on the SLA objective is to exempt more than violation associated with the shared resource.

6. The method as recited in claim 3, wherein the SLA violation is exempted from a penalty if the identified root cause corresponds to the limitation on the SLA objective.

7. A computing system, comprising:
   a plurality of computing devices to provide computing services to a customer under a service level agreement (SLA), the SLA to include an SLA objective, a limitation on the SLA objective, and a penalty; and
   a control system coupled to the computing devices, the control system comprising:
      a memory;
      a performance monitoring tool stored in the memory to monitor performance of the computing devices and identify an SLA violation based on the monitored performance; and
      an SLA modeling tool stored in the memory to generate a model of the SLA, to generate an exemption rule based on the model, the exemption rule to be generated before the performance monitoring tool is implemented under the SLA to monitor the performance of the computing devices, and to evaluate, based on the exemption rule, whether the identified SLA violation is exempt from the penalty.

8. The computing system as recited in claim 7, wherein the model of the SLA is based on the SLA objective, the limitation on the SLA objective, and the penalty.

9. The computing system as recited in claim 8, wherein the control system further comprises a root cause analysis tool to identify a root cause of the SLA violation, and wherein the SLA modeling tool is to evaluate whether the identified SLA violation is exempt from the penalty based on the identified root cause.

10. The computing system as recited in claim 9, wherein the identified SLA violation is exempt from a penalty if the identified root cause corresponds to the limitation on the SLA objective.

11. The computing system as recited in claim 7, wherein the SLA modeling tool is further configured to generate a report based on its evaluation, the report to include a citation to the portion of the SLA that contains the exemption for the SLA violation.

12. The computing system as recited in claim 8 wherein at least a portion of the plurality of computing devices are associated with a first data center, and wherein the SLA objective provides for a degree of redundancy within the first data center, the limitation on the SLA objective to be inversely related to the degree of redundancy provided by the SLA objective.

13. The computing system a recited in claim 12 wherein a first portion of the plurality of computing devices are associated with the first data center and a second portion of the plurality of computing devices are associated with a second data center that is remotely located from the first data center, and wherein the SLA objective provides for a degree of redundancy within the first data and within the second data center, the limitations on the SLA objective less than the limitation on SLA objective for redundancy within the first data center alone.

14. An article comprising at least one non-transitory computer-readable storage medium containing instructions stored therein that when executed by a processor-based system cause the processor-based system to:
   generate a model of a service level agreement (SLA), the SLA to include SLA objectives, limitations on the SLA objectives, and penalties for failure to meet the SLA objectives;
   based on the model, generate an exemption rule, the exemption rule to be generated before a computing system is monitored for noncompliance with the SLA;
   identify a failure to meet an SLA objective in the computing system that is providing computing services to a customer under the SLA; and
   automatically apply the exemption rule to evaluate whether the failure corresponds with at least one limitation on the failed SLA objective to exempt the failure from a penalty.

15. The article as recited in claim 14, wherein the instructions when executed by a processor-based system further cause the processor-based system to:
   identify a root cause of the failure; and
   evaluate whether the failure is exempt from a penalty based on the identified root cause.

16. The article as recited in claim 14, wherein the instructions when executed by a processor-based system further cause the processor-based system to generate a report of results of the evaluation, the report to contain a citation to a portion of the SLA that contains the exemption for the failure of the SLA objective.

* * * * *

UNITED STATES PATENT AND TRADEMARK OFFICE
CERTIFICATE OF CORRECTION

| | |
|---|---|
| PATENT NO. | : 8,103,480 B2 |
| APPLICATION NO. | : 12/262632 |
| DATED | : January 24, 2012 |
| INVENTOR(S) | : Amitay Korn et al. |

It is certified that error appears in the above-identified patent and that said Letters Patent is hereby corrected as shown below:

IN THE CLAIMS:

In column 7, line 27, in Claim 2, delete "for" and insert -- for the --, therefor.

In column 8, line 24, in Claim 13, delete "a" and insert -- as --, therefor.

In column 8, line 31, in Claim 13, delete "limitations" and insert -- limitation --, therefor.

Signed and Sealed this
Fourth Day of December, 2012

David J. Kappos
*Director of the United States Patent and Trademark Office*